(12) United States Patent
Ross

(10) Patent No.: US 8,907,779 B1
(45) Date of Patent: Dec. 9, 2014

(54) ALERTING DEVICE AND ASSOCIATED METHOD

(76) Inventor: Sandra Ross, Forest Park, IL (US)

( * ) Notice: Subject to any disclaimer, the term of this patent is extended or adjusted under 35 U.S.C. 154(b) by 257 days.

(21) Appl. No.: 13/407,272

(22) Filed: Feb. 28, 2012

Related U.S. Application Data

(60) Provisional application No. 61/447,158, filed on Feb. 28, 2011.

(51) Int. Cl.
*B60Q 7/00* (2006.01)

(52) U.S. Cl.
USPC .......................... 340/473; 340/471; 116/28 R

(58) Field of Classification Search
None
See application file for complete search history.

(56) References Cited

U.S. PATENT DOCUMENTS

| 3,878,810 | A | | 4/1975 | Conrad | |
|---|---|---|---|---|---|
| 3,890,497 | A | * | 6/1975 | Rush | 362/473 |
| 3,967,575 | A | | 7/1976 | Coutts | |
| 4,598,339 | A | * | 7/1986 | Ainsworth | 362/540 |
| 5,363,792 | A | * | 11/1994 | Petechik | 116/28 R |
| 5,448,402 | A | | 9/1995 | Lorenzana | |
| 2010/0252711 | A1 | * | 10/2010 | Buchner | 248/539 |

* cited by examiner

*Primary Examiner* — Hai Phan
*Assistant Examiner* — Ojiako Nwugo

(57) ABSTRACT

An alerting safety device includes a pole formed from flexible material, a flag attached to the pole, a fastening member attached to a bottom end of the pole, a coupling attached to the fastening member and spaced from the pole, and a light-emitting section attached to a top most end of the pole above the flag. Notably, the light-emitting section is automatically toggled between on and off modes upon receiving input signals respectively.

8 Claims, 5 Drawing Sheets

ALERTING DEVICE AND ASSOCIATED METHOD

CROSS REFERENCE TO RELATED APPLICATIONS

This application claims the benefit of U.S. Provisional Application No. 61/447,158 filed Feb. 28, 2011, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

1. Technical Field

This invention relates to safety devices and, more particularly, to an alerting device for providing users with an easy and convenient means of warning motorist of a slow moving vehicle or assistive mobility vehicle close by.

2. Prior Art

Over 54 million Americans suffer from some form of limited mobility. In fact, according to statistics compiled by the Center for Disease Control (CDC), these numbers are ever increasing. Limited mobility can result from a variety of causes such as arthritis, muscle deterioration or inactivity. In addition, over eleven thousand Americans suffer an injury to the spinal cord. Often resulting in paraplegia (paralysis from the legs down) or quadriplegia (paralysis from the neck down) the severity of one's condition depends upon the location on the spinal cord which was injured. According to statistics compiled by the National Spinal Cord Injury Association (NSCIA) and the National Spinal Cord Injury Statistical Center (NSCISC), there are approximately 250,000 Americans living with this debilitating injury in the United States today.

Regardless of whether one suffers limited mobility brought on by disease or by injury to the legs, back or spinal cord, many of these infirmities result in the sufferer becoming temporarily or permanently dependent upon a wheelchair. Wheelchairs are extremely practical devices which enable those with limited mobility to get from one place to another in a simple and comfortable manner. While those who suffer paraplegia, quadriplegia, cerebral palsy or similar ailments most often utilize a wheelchair, these devices are also often used by seniors, those with heart or lung conditions, as well as other consumers who do possess the ability to walk, but simply lack the strength or dexterity to do so for extended periods.

For those who depend on wheelchairs, these devices are necessary regardless of whether spending time indoors or out. In fact, many who suffer limited mobility lead very active lives and enjoy participating in various outdoor sports or recreational activities. Unfortunately, as with anyone else, there are occasions when spending time outdoors that those who depend on assistive mobility devices are at risk for injury. Specifically, when spending time outdoors after nightfall consumers who depend on wheelchairs, scooters and other mobility devices can be difficult for those traveling in cars and trucks to see. Every year, thousands of consumers are struck by vehicles when walking near or across streets and roadways.

In fact, according to the Center for Disease Control nearly 85,000 consumers suffer traffic related injuries each year, with approximately 5,000 of these injuries resulting in a fatality. Not surprisingly, children are especially at risk when it comes to traffic related accidents, with nearly 32% of non-fatal pedestrian injuries and 12% of pedestrian fatalities reported incurred by children under the age of fifteen. Perhaps one of the most prevalent causes of these types of accidents is that the passing motorist simply does not see the pedestrian on or near the road.

In particular, for those driving light trucks, SUV's, professional service trucks, or long haul freight liners, the very height of the vehicle cab can serve to obstruct pedestrians, such as those in wheelchairs and scooters, who are positioned low to the ground, thus resulting in the unaware motorist striking, injuring and in worse cases killing, a passing pedestrian.

Accordingly, a need remains for a device in order to overcome the above-noted shortcomings. The present invention satisfies such a need by providing an alerting device that is convenient and easy to use, lightweight yet durable in design, versatile in its applications, and designed for warning motorists of a slow moving or assistive mobility vehicle close by.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an alerting safety device for warning a moving vehicle of a pedestrian-operated transporter. These and other objects, features, and advantages of the non-limiting exemplary embodiment(s) are provided by the alerting safety device including a pole formed from flexible material, a flag attached to the pole, a fastening member attached to a bottom end of the pole, a coupling attached to the fastening member and spaced from the pole, and a light-emitting section attached to a top most end of the pole above the flag. Notably, the light-emitting section is automatically toggled between on and off modes upon receiving input signals respectively.

In a non-limiting exemplary embodiment, the flag includes first, second and third coextensively shaped wings statically mated to the pole.

In a non-limiting exemplary embodiment, the flag is provided with a reflective coating for reflecting light.

In a non-limiting exemplary embodiment, the light-emitting section is toggled between the on and off modes when the reflective coating reflects a minimum quantity of lumens.

In a non-limiting exemplary embodiment, the fastening member includes a tubular first member statically coupled to the bottom end of the pole, a tubular second member dynamically coupled to the tubular first member, and a first adjustment knob selectively locking the tubular first member to the tubular second member. In this manner, the tubular first member and the pole are contemporaneously rotated relative to the tubular second member.

In a non-limiting exemplary embodiment, the coupling includes a c-shaped first member statically mated to the tubular first member, a c-shaped second member removably locked with the c-shaped first member, and a second adjustment knob removably mated to first ends of the c-shaped first and second members respectively. Notably, the c-shaped first member has a notch formed at a second end thereof. The c-shaped second member has a protruding finger formed at a second end thereof. In this manner, the protruding finger is interfitted within the notch when the adjustment knob is mated to the first ends.

In a non-limiting exemplary embodiment, the coupling is a c-clamp fixedly mated to the fastening member and oppositely spaced from the first adjustment knob.

The present disclosure further includes a method of utilizing an alerting safety device for warning a moving vehicle of a pedestrian-operated transporter. Such a method includes the chronological steps of: providing a pole formed from flexible material; providing and attaching a flag to the pole; providing and attaching a fastening member to a bottom end of the pole; providing and attaching a coupling to the fastening member; spacing the coupling from the pole; providing and attaching a light-emitting section to a top most end of the pole above the flag; and the light-emitting section automatically toggling between on and off modes upon receiving input signals respectively.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
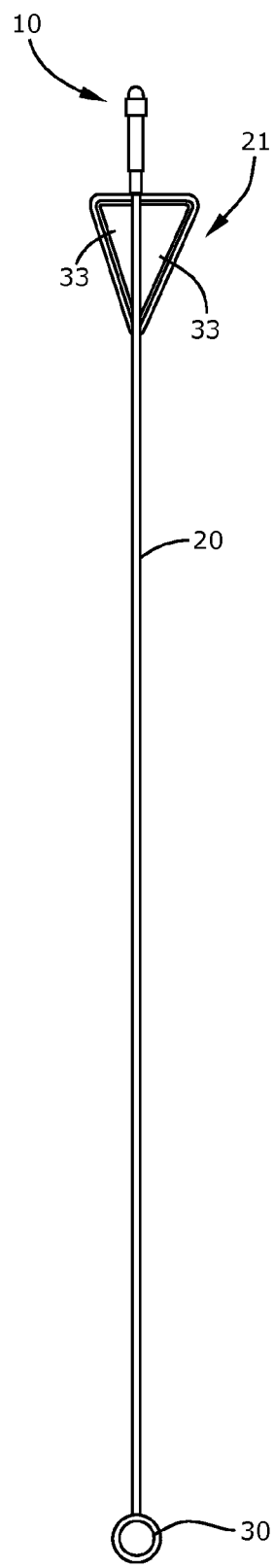
FIG. 1 is a perspective view showing an alerting safety device, without the coupling, at a telescopically elongated position, in accordance with the non-limiting exemplary embodiment(s)

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 2:
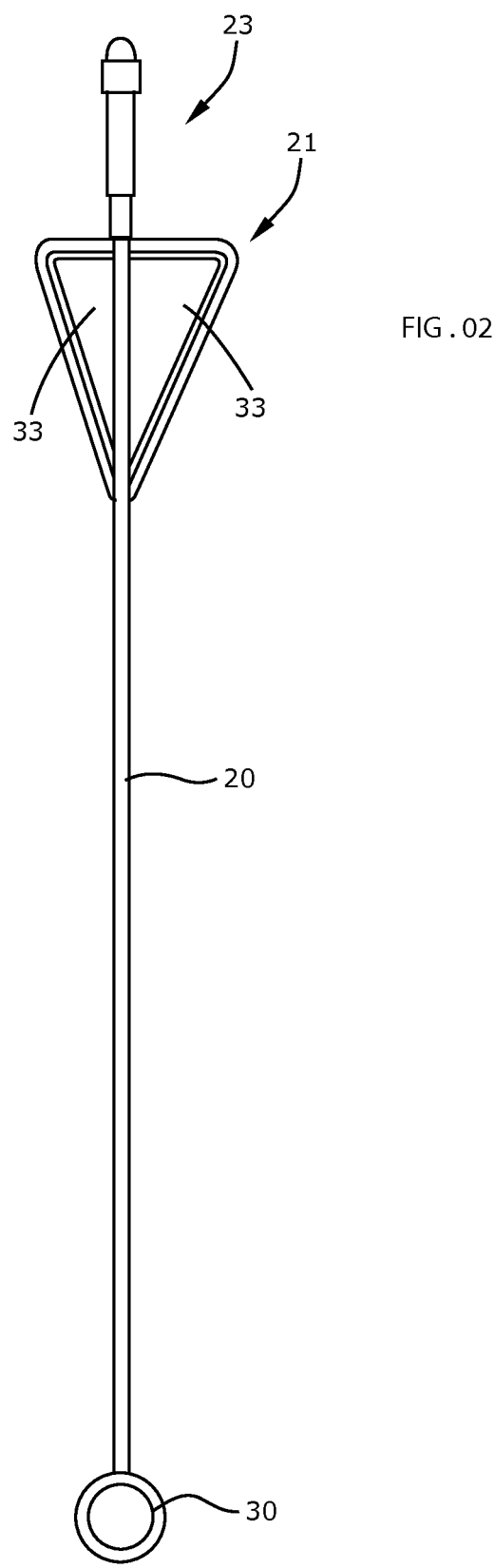
FIG. 2 is a perspective view showing the alerting safety device at a telescopically shortened position.
Figure 3:
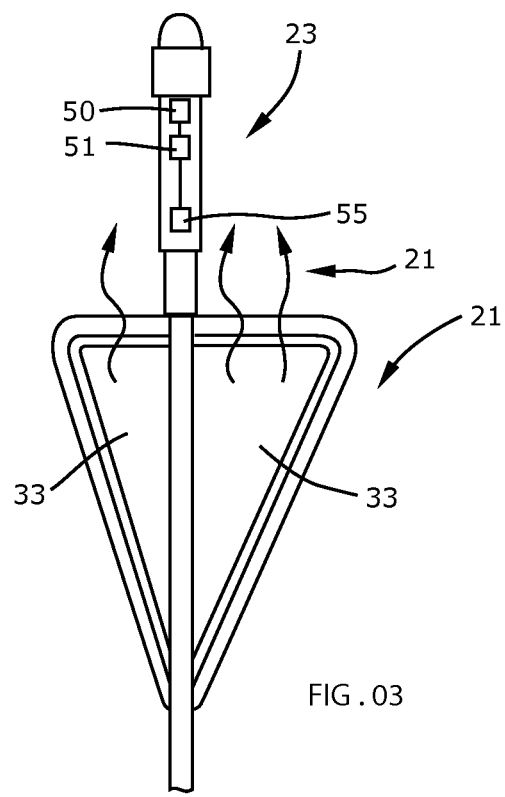
FIG. 3 is an enlarged view showing the flag and light-emitting section.
Figure 4:
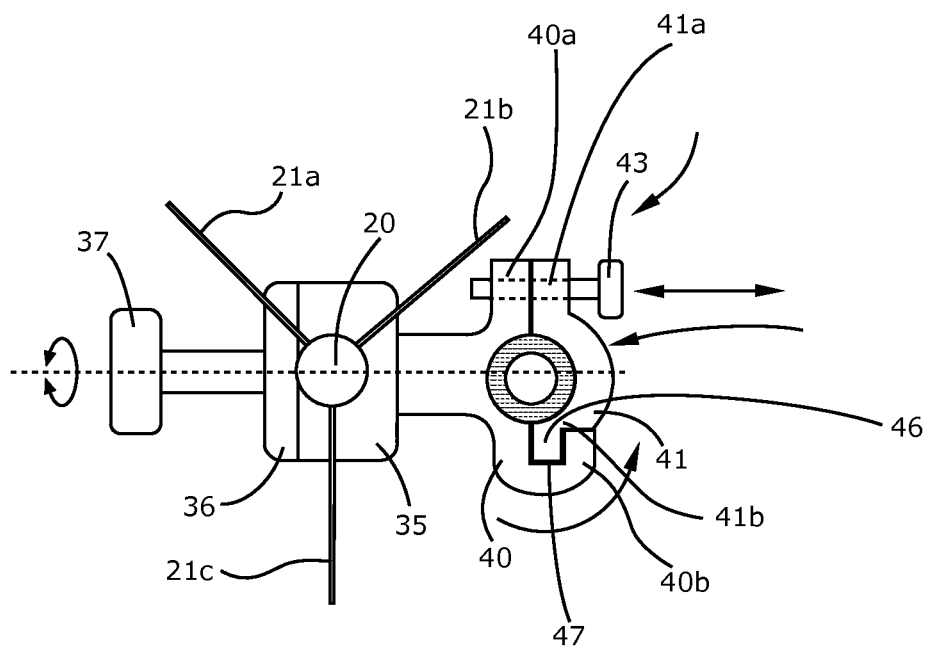
FIG. 4 is a top plan view showing the alerting safety device with the coupling attached to the fastening member.
Figure 5:
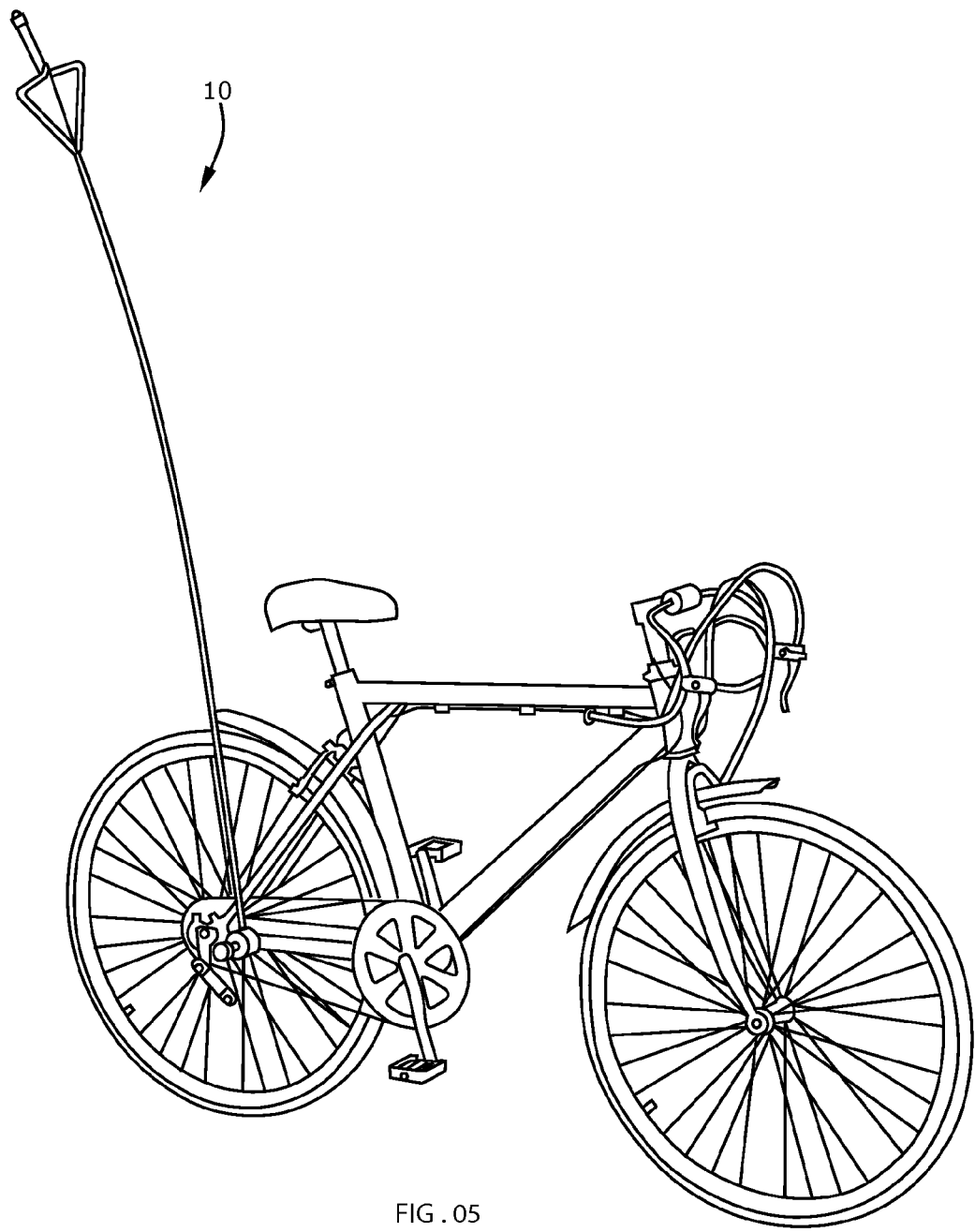
FIGS. 5-6 are perspective views showing the alerting safety device in alternate environments.
Figure 6:
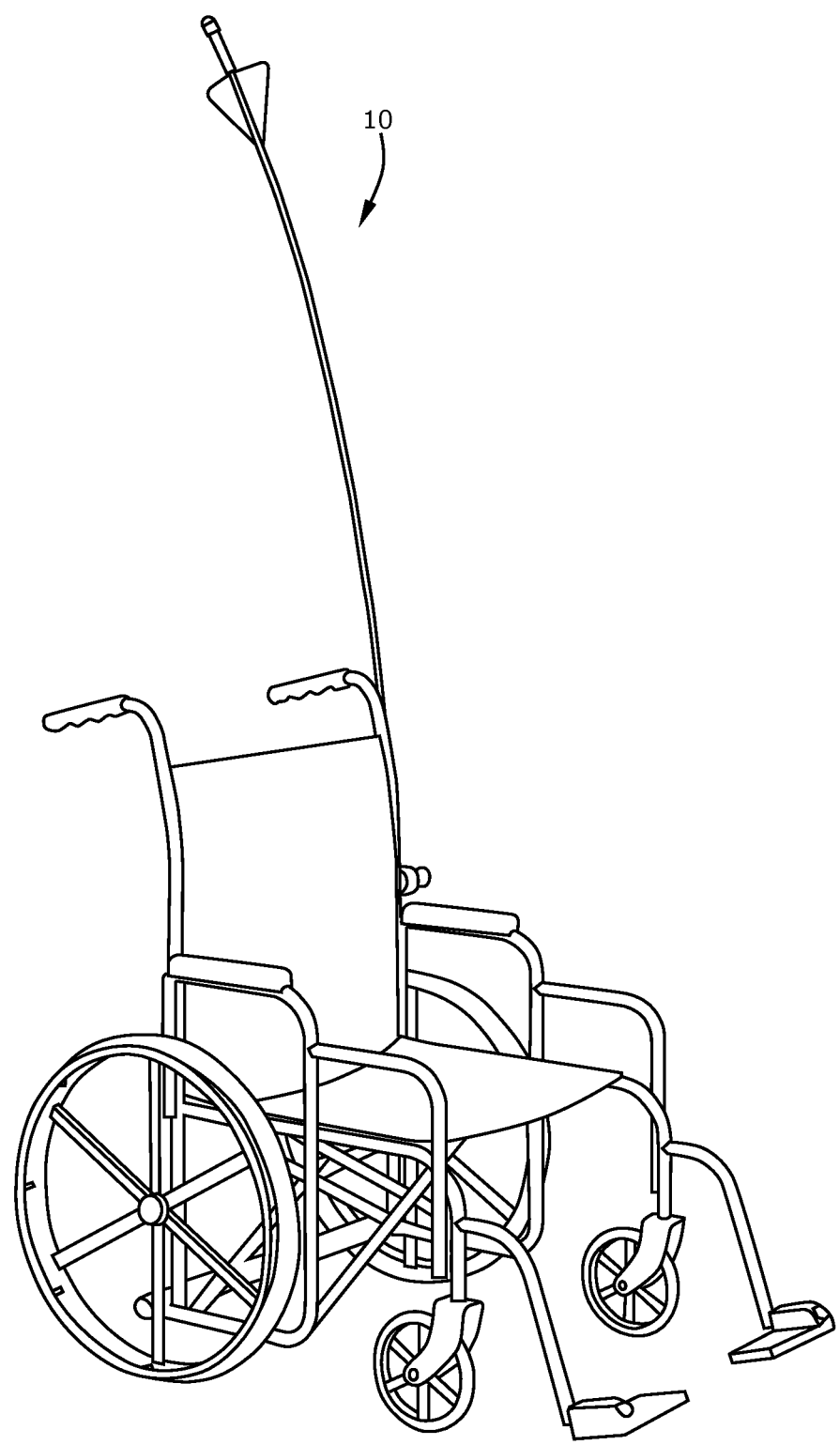

The non-limiting exemplary embodiment(s) is/are referred to generally in FIGS. 1-6 and is/are intended to provide an alerting safety device. It should be understood that the present invention may be used to alert motorists of a slow moving or assistive mobility vehicle and many different types of vulnerable objects close by, and should not be limited to the uses described herein. The device may also be used by people using bicycles, recumbent bikes and jogging strollers, for example, so motorists would see them more closely.

Referring to FIGS. 1-6 in general, an alerting safety device 10 for warning a moving vehicle of a pedestrian-operated transporter is shown. Such an alerting safety device 10 includes a pole 20 formed from flexible material, a flag 21 attached to the pole 20, a fastening member 30 attached to a bottom end of the pole 20, a coupling 31 attached to the fastening member 30 and spaced from the pole 20, and a light-emitting section 23 attached to a top most end of the pole 20 above the flag 21. Notably, the light-emitting section 23 is automatically toggled between on and off modes upon receiving input signals 32 respectively. Such input signals 32 are the reflections emitted by the reflective coating 33 when light shines thereon.

In a non-limiting exemplary embodiment, the flag 21 includes first 21a, second 21b and third 21c coextensively shaped wings statically mated to the pole 20.

In a non-limiting exemplary embodiment, the flag 21 is provided with a reflective coating 33 for reflecting light. The reflective coating 33 generates and emits the input signals 32 when light shines thereon. Such reflected light rays are picked up by sensors 50 communicatively coupled to the light-emitting section 23.

In a non-limiting exemplary embodiment, the light-emitting section 23 is toggled between the on and off modes when the reflective coating 33 reflects a minimum quantity of lumens. One skilled in the art understands such a minimum quantity can be adjusted by calibrating sensors 50 or adjusting reflective coating 33. That is, when sensors 50 detect input signals 32 from reflective coating 33, a switch 51 is toggled to a closed position and thereby transmits power 55 to light-emitting section 23, which illuminates. In a similar manner, when light rays are not reflected from reflective coating 33, sensors 50 do not detect input signals 32 and switch 51 remains at an open position so that power is not transmitted to light-emitting section 23.

In a non-limiting exemplary embodiment, the fastening member 30 includes a tubular first member 35 statically coupled to the bottom end of the pole 20, a tubular second member 36 dynamically coupled to the tubular first member 35, and a first adjustment knob 37 selectively locking the tubular first member 35 to the tubular second member 36. In this manner, the tubular first member 35 and the pole 20 are contemporaneously rotated relative to the tubular second member 36.

In a non-limiting exemplary embodiment, coupling 31 includes a c-shaped first member 40 statically mated to the tubular first member 35, a c-shaped second member 41 removably locked with c-shaped first member 40. A second adjustment knob 43 is removably mated to first ends 40a, 41a of the c-shaped first and second members 40, 41, respectively. Notably, the c-shaped first member 40 has a notch 47 formed at a second end 40b thereof. The c-shaped second member 40 has a protruding finger 46 formed at a second end 41b thereof. In this manner, the protruding finger 46 is interfitted within the notch 47 when the second adjustment knob 43 is mated to the first ends 40a, 41a.

In a non-limiting exemplary embodiment, the coupling 31 is a c-clamp 22 fixedly mated to the fastening member 30 and oppositely spaced from the first adjustment knob 37.

The present disclosure further includes a method of utilizing an alerting safety device 10 for warning a moving vehicle of a pedestrian-operated transporter. Such a method includes the chronological steps of: providing a pole 20 formed from flexible material; providing and attaching a flag 21 to the pole 20; providing and attaching a fastening member 30 to a bottom end of the pole 20; providing and attaching a coupling 31 to the fastening member 30; spacing the coupling 31 from the pole 20; providing and attaching a light-emitting section 23 to a top most end of the pole 20 above the flag 21; and the light-emitting section 23 automatically toggling between on and off modes upon receiving input signals 32 respectively.

In a non-limiting exemplary embodiment, the alerting device 10 may include a telescoping pole 20 and a flag 21. The flag 21 may be attached to a top end portion of the telescoping pole 20. A C-clamp 22 may be fixedly mated to a bottom end portion of the telescoping pole 20. The pole 20 may further be detachably mated to a slow moving vehicle 11 via the C-clamp 22. The flag 21 may further include a reflective coating 33 which would enable the device 10 to which they are attached, to be easily spotted by motorists and others. The yield sign flag 21 may be manufactured in roll form, or as a wide, flat panel produced in sizes up to 10" in width and length for example. The reflective material may further be designed to reflect the light emitted by vehicle headlights, street lamps or illuminated signage. In addition, the material of the flag 21 may be of a conspicuous color, such as bright silver, green, orange or yellow, ensuring clear visibility during the daylight hours. The flag 21 may be designed to spin and sway in different directions thus increasing visibility of users. A red light 23 connected to a portable power source may further be located at the top of the pole 20 to visually alert passing motorists in the dark.

As a non-limiting example, the device 10 may be a 3 feet, turquoise and white stripped pole 20 made of highly reflective material that can be extended to approximately 5 feet depending on the vehicle the pole 20 is attached to. At the top is a reflective "YIELD" sign 21 made of reflective yellow material with an orange red stripe on its edge. The "YIELD" sign 21 turns as the vehicle 11 moves and wind blows it causing the pole 20 to wave back and forth slightly making the device 10 more noticeable. There is a red light 23 attached to the top of the pole 20, making it more visible. The advantage of the device 10 over conventional alerting devices is its highly reflective turquoise and white stripped material. The revolving "YIELD" orange sign 21 and the red light 23 at the top of the pole 20 further enable motorists to easily see the device 10 coming towards and away from them.

The alerting device 10 may provide users with a number of significant benefits and advantages. Foremost, the device 10 would provide users who depend on wheelchairs, scooters and other assistive devices, a simple means of alerting passing motorists to their presence on the road. The device 10 would provide a clearly visible alert to passing motorist to take extra caution and care when passing. Produced in vibrant, eye catching colors, use of the device 10 would ensure that drivers of light trucks, SUV's or even eighteen wheelers could clearly view the traveling user from their high perch in the vehicle cab.

In this manner, the device 10 could prove an invaluable safety tool, preventing motorists from accidentally striking those who depend on assistive devices and thus, effectively prevent accidents, injury and even death. Ideal for use by adults, the device 10 would also be well suited for use by teens and children who suffer varying degrees of limited mobility. Although designed specifically for use on wheelchairs and scooters, the device 10 could also be applied to walkers, crutches, canes and similar mobility aids, enabling consumers who suffer a wide array of medical maladies to benefit from the device 10.

In use, the alerting device 10 would be simple and straightforward to use. Users would simply purchase the device 10 in sizes appropriate for their assistive mobility vehicle 11. Once purchased, the user, alone or with the help of a friend, may install the device 10 in designated areas about their wheelchair, scooter or other mobility tool. Once positioned in place, the device 10 would provide a clearly visible beacon to passing motorists, alerting them to the presence of the user and enabling them to take necessary safety precautions.

In an alternative embodiment, the alerting device 10 may feature a pulley system for raising the flag 21 when a higher level of visibility is needed. In this way, disabled users who may not be able to stand up may be able to raise and adjust the flag 21 to ensure a good visibility of the device 10 to passing motorists.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. An alerting safety device for warning a moving vehicle of a pedestrian-operated transporter, said alerting safety device comprising:
    a pole;
    a flag attached to said pole;
    a fastening member attached to a bottom end of said pole;
    a coupling attached to said fastening member; and
    a light-emitting section attached to a top most end of said pole;
    wherein said light-emitting section is automatically toggled between on and off modes upon receiving input signals respectively;
    wherein said flag comprises first, second and third coextensively shaped wings statically mated to said pole;
    wherein said flag is provided with a reflective coating for reflecting light;
    wherein light-emitting section is toggled between said on and off modes when said reflective coating reflects a minimum quantity of lumens.

2. The alerting safety device of claim 1, wherein said fastening member comprises:
    a tubular first member statically coupled to said bottom end of said pole;
    a tubular second member dynamically coupled to said tubular first member; and
    a first adjustment knob selectively locking said tubular first member to said tubular second member;
    wherein said tubular first member and said pole are contemporaneously rotated relative to said tubular second member.

3. The alerting safety device of claim 2, wherein said coupling comprises:
    a c-shaped first member statically mated to said tubular first member;
    a c-shaped second member removably locked with said c-shaped first member; and
    a second adjustment knob removably mated to first ends of said c-shaped first and second members respectively;
    wherein said c-shaped first member has a notch formed at a second end thereof;
    wherein said c-shaped second member has a protruding finger formed at a second end thereof;
    wherein said protruding finger is interfitted within said notch when said second adjustment knob is mated to said first ends.

4. The alerting safety device of claim 2, wherein said coupling is a c-clamp fixedly mated to said fastening member and oppositely spaced from said first adjustment knob.

5. An alerting safety device for warning a moving vehicle of a pedestrian-operated transporter, said alerting safety device comprising:
    a pole formed from flexible material;
    a flag attached to said pole, wherein said flag is provided with a reflective coating for reflecting light;
    a fastening member attached to a bottom end of said pole;
    a coupling attached to said fastening member and spaced from said pole; and
    a light-emitting section attached to a top most end of said pole above said flag;
    wherein said light-emitting section is automatically toggled between on and off modes when said reflective coating reflects a minimum quantity of lumens;
    wherein said fastening member comprises
        a tubular first member statically coupled to said bottom end of said pole;
    a tubular second member dynamically coupled to said tubular first member; and
        a first adjustment knob selectively locking said tubular first member to said tubular second member;
        wherein said tubular first member and said pole are contemporaneously rotated relative to said tubular second member.

6. The alerting safety device of claim 5, wherein said flag comprises: first, second and third coextensively shaped wings statically mated to said pole.

7. The alerting safety device of claim 5, wherein said coupling comprises:
    a c-shaped first member statically mated to said tubular first member;
    a c-shaped second member removably locked with said c-shaped first member; and
    a second adjustment knob removably mated to first ends of said c-shaped first and second members respectively;

wherein said c-shaped first member has a notch formed at a second end thereof;

wherein said c-shaped second member has a protruding finger formed at a second end thereof;

wherein said protruding finger is interfitted within said notch when said second adjustment knob is mated to said first ends.

8. The alerting safety device of claim 5, wherein said coupling is a c-clamp fixedly mated to said fastening member and oppositely spaced from said first adjustment knob.

* * * * *